March 12, 1957
R. F. KNEISLEY ET AL
2,784,885
LIQUID DISPENSING DEVICE
Filed Sept. 26, 1955
2 Sheets-Sheet 1
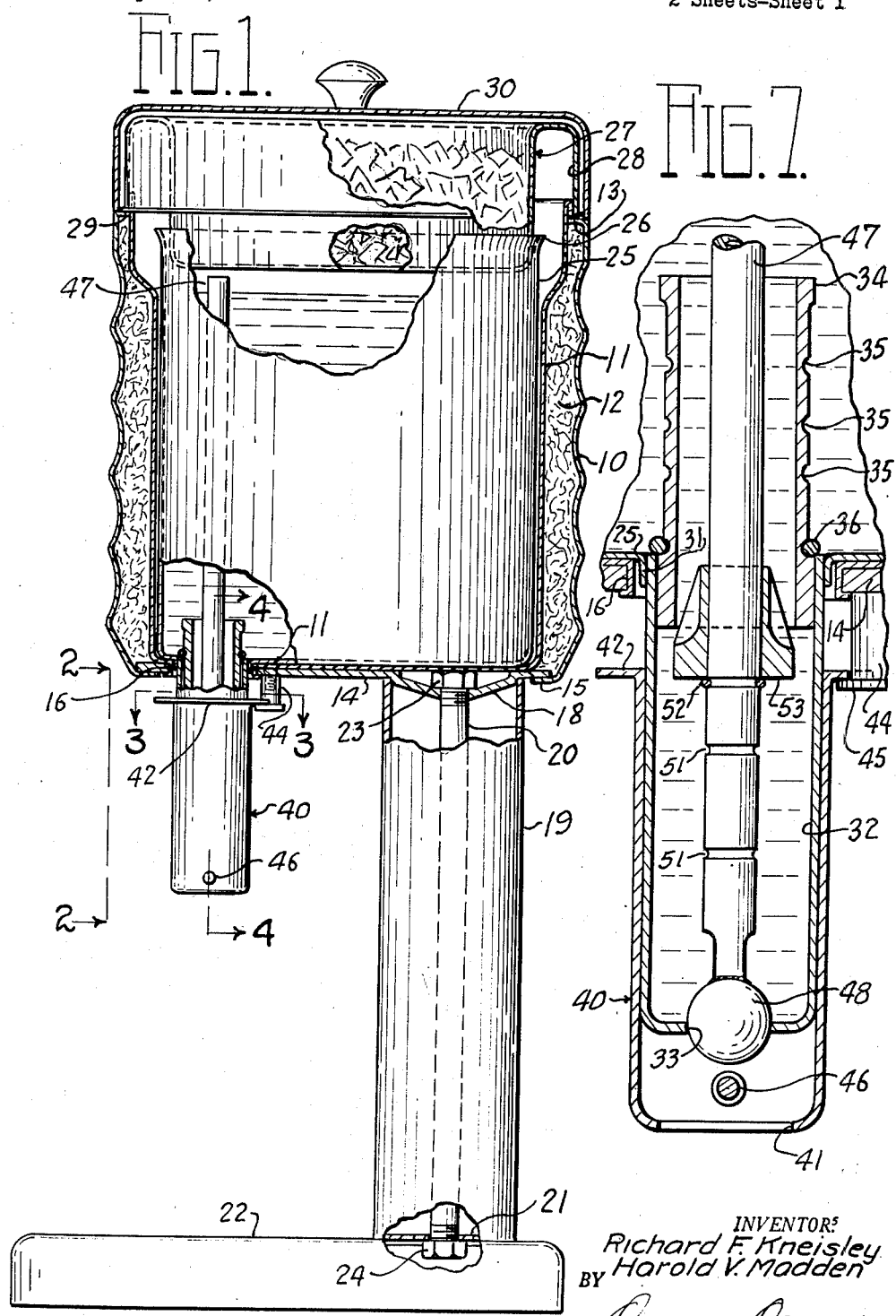
INVENTORS
Richard F. Kneisley
BY Harold V. Madden
Owen + Owen
ATTORNEYS

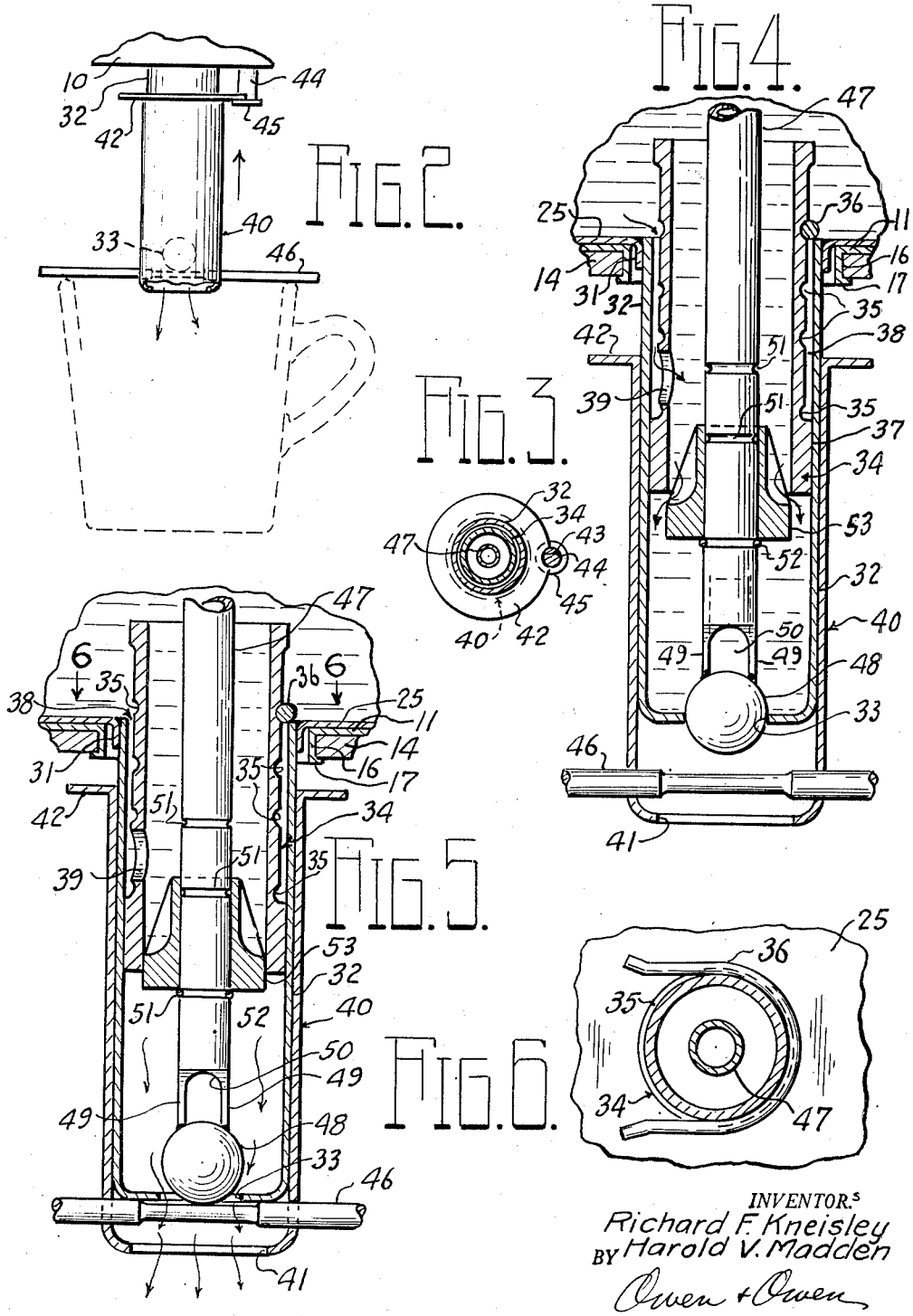

2,784,885

LIQUID DISPENSING DEVICE

Richard F. Kneisley and Harold V. Madden, Toledo, Ohio

Application September 26, 1955, Serial No. 536,524

2 Claims. (Cl. 222—439)

This invention relates to a device for repetitively dispensing measured charges of liquids and will be illustrated in its embodiment as a cream dispensing device for use in restaurants and other food service establishments, which discharges a measured quantity of cream into a cup whenever the cup is raised against a valve tripping mechanism.

It has become customary in many food serving establishments, particularly in those of the less formal nature, for the waitress to inquire of the patron whether or not he wishes cream in his coffee and then to serve the cream already mixed in the cup. In order to facilitate this type of service some device is needed to store a supply of cream in good condition and to deliver a measured quantity of cream into the cup in response to a simple triggering action.

The principal object of this invention is the provision of a cream or other liquid dispensing device which will dispense a measured quantity of liquid each time its valve is triggered, directly into the container with which the valve is triggered.

It is a further object of this invention to provide a cream dispensing device which is easy to disassemble, thus facilitating cleanliness and not requiring any particular mechanical aptitude for its disassembly and reassembly.

It is yet another object of this invention to provide a device which can be quickly and easily modified to change the quantity of liquid dispensed at each operation.

A still further object of this invention is to provide a cream or other liquid dispensing device which is so constructed and designed as to provide for a compact, simple and modern styled housing and mounting.

Further objects and advantages will be better understood from the specification which follows and from the drawings, in which:

Fig. 1 is a view partly in vertical section and partly in elevation and with parts broken away illustrating a liquid dispensing device embodying the invention.

Fig. 2 is a fragmentary view in elevation taken from the position indicated by the line 2—2 in Fig. 1 and illustrating how the device is triggered to discharge a measured quantity of fluid into an open container such as a coffee cup or small glass.

Fig. 3 is a horizontal sectional view taken along the line 3—3 of Fig. 1.

Fig. 4 is a fragmentary vertical sectional view taken on an enlarged scale along the line 4—4 of Fig. 1 and showing the discharge mechanism in closed position.

Fig. 5 is a view similar to Fig. 4 but showing the mechanism in liquid discharge position.

Fig. 6 is a fragmentary horizontal sectional view taken along the line 6—6 of Fig. 5.

Fig. 7 is a view similar to Fig. 4 showing the parts in position to provide for the discharge of a measured quantity of liquid larger than that discharged with the parts in the position shown in Fig. 4.

While the operation of the device will be discussed particularly with respect to the dispensing of a measured quantity of cream into a coffee cup, it will be appreciated that a device embodying the invention may also be utilized for the discharge of measured quantities of other fluids. For example, particularly with the device arranged for the discharge of a larger volume of fluid, a device embodying the invention may be utilized for the discharge of orange juice into small open topped glasses. Similar liquids such as other fruit and vegetable juices may also be stored and dispensed by a device embodying the invention. In larger sizes, devices embodying the invention may be utilized for the discharge of other liquids such as ice water and milk.

A device embodying the invention has an outer jacket 10 and a spaced inner jacket 11 between which is provided a space for thermal insulation generally indicated at 12. The outer jacket may be decoratively shaped to enhance the appearance of the device. Both of the jackets 10 and 11 are generally cylindrical in shape and their upper lips are crimped to each other as indicated at 13 during assembly of the jacket. The inner jacket 11 rests upon a base plate 14 and a lower lip 15 of the outer jacket 10 is turned under the edges of the base plate 14. The inner jacket 11 has a tubular neck 16 (see also Fig. 4) which extends through an opening in the base plate 14 and has a return lip 17 sealing the inner jacket 11 to the base plate 14. The jackets 10 and 11 are assembled by telescoping the inner jacket into the interior of the outer jacket 10 and the assembly of the inner and outer jackets 10 and 11 of the base plate is unified by crimping the lip 17 tightly against the undersurface of the base plate 14.

Near the rear, and diametrically opposed from the neck 16 of the inner jacket 11, the base plate 14 has a depressed conical section 18 which fits into the upper open end of a support column 19 and is centrally drilled for a support column tie rod 20 extending downwardly through the center of the support column 19. The lower end of the support column 19 circumscribes a raised circular area 21 on the upper surface of an inverted pan-like base 22. A nut 23 on the end of the tie rod 20 above the section 18 and a nut 24 on the end of the tie rod 20 below the area 21, are tightened to clamp the support column 19 to the base plate 14 and base 22.

A cup shaped liquid container 25 fits into the interior of the inner jacket 11 with its bottom resting upon the bottom of the inner jacket 11. The container 25 has a flared uper edge 26 for the reception of a circular ice tray generally indicated at 27. The ice tray 27 has a downwardly extending return lip 28 of a diameter such that it embraces the crimped upper edges of the outer and inner jackets 10 and 11 and rests upon a shelf 29 formed by a horizontal flange of the outer jacket 10 adjacent the crimped edges of the jackets 10 and 11. An inverted pan shaped cover 30 encloses the open top of the ice tray 27 and covers the device completely, extending over and resting on the same lip 29 of the jacket 10 which supports the ice tray 27.

The liquid container 25 has a downwardly opening neck 31 (Fig. 4) in line with the neck 16 of the inner jacket 11. A tubular discharge spout 32 is welded in the neck 31 and extends vertically downward therefrom. The lower end of the discharge spout 32 is rolled inwardly forming a centrally located, circular valve seat 33. A tubular adjusting barrel 34 is positioned in the interior of the spout 32, extending upwardly into the liquid container 25 and downwardly into the spout 32. The barrel 34 has a plurality of vertically spaced annular grooves 35 cut in its outer surface for the reception of a U-shaped positioning clip 36 (see also Fig. 6) by means of which the adjusting barrel 34 is supported in any one of a plurality of vertical positions within the spout 32. The lower end of the barrel 34 has an annular shoulder 37 slidingly fitting the interior of the spout 32. The main body of the barrel 34 is of smaller outer diameter leaving an annular passageway 38 between the exterior of the barrel 34 and the interior of the spout 32. A radial opening 39 through the wall of the barrel 34 connects the annular passageway 38 with the interior of the barrel 34.

A flanged valve trip sleeve 40 is telescopingly mounted on the exterior of the discharge spout 32, its lower end having a circular opening 41 at least generally concentric with the valve seat 33 in the bottom end of the discharge spout 32 and its upper end having a horizontal flange 42. At one edge of the flange 42 (see Fig. 3) a circular notch 43 is cut and, with the parts in assembled position, the notch 43 slidingly engages a guide 44 studded in or attached to the underside of the base plate 14. Engagement of the notch 43 with the guide 44 prevents the rotation of the trip sleeve 40. The guide 44 has an enlarged head 45 which catches the lip 42 of the trip sleeve 40 in its lowermost position and prevents the trip sleeve 40 from sliding off the discharge spout 32. A trip bar 46 extends horizontally through the trip sleeve 40 near its lower end, the bar 46 being engaged by the lips of a cup or glass which is moved upwardly to lift the trip sleeve 40 as is illustrated in Fig. 2 and will be later described.

A vent tube 47 extends downwardly through the center of the barrel 44 and into engagement with a ball valve 48 which cooperates with the seat 33 to control the flow of liquid out of the discharge spout 32. The lower end of the vent tube 47 is cut away on opposite sides to provide spaced legs 49 the ends of which actually contact the ball 48, leaving lateral openings 50 into the interior of the vent tube 47 at its lower end. The body of the vent tube 47 has a plurality of longitudinally spaced annular grooves 51 for the reception of a split ring 52 for spacing and supporting a vertically movable upper valve 53. The valve 53 has an outer diameter such that it cooperates with the inner lower end of the adjusting barrel 34 when in its upper position as illustrated in Fig. 5.

The rest position of the parts is illustrated in Fig. 4 where it can be seen that the ball valve 48 is seated in its opening 33 and the upper valve 53 is below the end of the barrel 34. In this position of the parts, cream or other liquid in the container 25 flows by gravity downwardly through the interior of the adjusting barrel 34 and through the annular space 38 and the opening 39 into the adjusting barrel 34. It flows downwardly out of the end of the barrel 34 and around the valve 53 and fills the discharge spout 32 above the ball 48.

When it is desired to dispense a charge of liquid, a cup or other container is placed beneath the opening 41 of the trip sleeve 40 and moved upwardly as illustrated in Fig. 2 until its edge strikes the trip bar 46. Continued upward movement of the cup or glass lifts the trip sleeve 40 and moves the bar 46 upwardly until it engages the ball 48. This lifts the ball valve 48 from its seat in the opening 33 and at the same time lifts the vent tube 47 and the upper valve 53 into sealing cooperation with the lower end of the adjusting barrel 34. The volume of liquid in the discharge spout 32 below the valve 53 flows downwardly out of the spout 32 and into the cup or glass held beneath the opening 41. Since the vent tube 47 extends upwardly above the level of the liquid in the container 25 (see Fig. 1) air from above the liquid is vented to the interior of the discharge spout 32 so that the liquid therein flows out freely.

As the cup is removed from beneath the device gravity causes the trip sleeve 40 and bar 46 to move downwardly and the ball 48 and vent tube 47 follow along until the ball 48 seats itself again in the opening 33 and the upper valve 53 leaves the lower end of the adjusting barrel 34 allowing the liquid to flow into the interior of the discharge spout as earlier described.

Fig. 7 illustrates the positioning of the several parts of the device which are adjustable to provide for a larger volume of liquid to be dispensed upon each actuation of the valving mechanism. In Fig. 7 the U-clip 36 is shown as engaged in the lowermost one of the grooves 35 in the exterior of the barrel 34. Correspondingly, the split ring 52 is shown as engaged in the uppermost one of the annular grooves 51 in the exterior of the vent tube 47. With the parts in this position the volume in the interior of the discharge spout 32 below the end of the adjusting barrel 34 and upper valve 53 is substantially larger than the volume within the spout 32 when the parts are in the position shown in Figs. 4 and 5. Except for this difference in assembled relationship of the adjusting barrel 34 and upper valve 53, the mechanism as illustrated in Fig. 7 is identical with the mechanism illustrated in Figs. 4 and 5.

When it is desired to clean the device the cover 30 and ice tray 27 are removed. The liquid container 25 is lifted vertically. The discharge spout 32 being welded to the neck 31 of the liquid container 25 is also lifted vertically and the U-clip 36 continues to support the barrel 34 so that the barrel 34 is also lifted with the liquid container 25. Therefore, the discharge spout 32, barrel 34, ball valve 48, vent tube 47 and upper valve 53 all remain in their closed positions as illustrated in Fig. 4 and are lifted up with the liquid container 25. When the lower end of the discharge spout 32 is withdrawn from within the trip sleeve 40, gravity causes the trip sleeve 40 to swing and fall off the head 45 of the guide 44. The adjusting barrel 34 may then be removed from the interior of the discharge spout 32 by merely lifting it vertically as may the vent tube 47 and its associated upper valve 53. The ball valve 48 can then be rolled out of the discharge spout 32. The mechanism is reassembled by reversing the steps just outlined.

While the embodiment of the invention illustrated in the drawings and described above is shown as employing a ball valve at the lower end of the discharge spout 32 and a spool type valve 53 as an upper valve closer, it will be appreciated that both the lower and upper valve closers may be conical in shape, for example, with the lower valve closer an inverted cone and the upper valve closer an erect cone. Both the upper and lower valve closers may be secured to the vent tube 47, which functions also as a valve stem, rather than the vent tube merely resting on the lower valve closer such as the ball 48 and supporting the upper valve closer 53. Regardless of the particular configuration of the upper and lower valve closers, their vertical spacing is such that the upper valve is closed almost immediately after the lower valve is opened so that no appreciable quantity of liquid flows into the space in the spout 32 between the upper and lower valves after the lower valve has been opened.

We claim:

1. A liquid dispensing device comprising a liquid container, a tubular discharge spout extending downwardly therefrom, a ball valve within said spout and a cooperating valve seat in the lower end of said spout, a valve stem resting on said ball and extending upwardly through said spout, an upper valve carried on said stem, means for mounting said upper valve at any of a plurality of positions on said stem, an upper valve seat, means for mounting said upper valve seat in any of a plurality of positions in said spout for cooperation with said upper valve, and means for raising said ball and said stem for effecting discharge of liquid from the space in the interior of said spout between said ball and said upper valve comprising a sleeve telescoped over the exterior of said spout and a transverse bar through said sleeve and engageable with said ball when said sleeve is moved upwardly thereover.

2. A device for dispensing a measured volume of liquid comprising, in combination, a liquid container, a downwardly extending tubular spout on said container, a circular valve seat at the lower end of said spout, a vertically movable valve closer cooperating with said seat when at its lower position to close the lower end of said spout, a sleeve extending downwardly into the upper end of said spout, said sleeve having a sliding fit with the interior of said spout, a valve stem extending downwardly through said sleeve and into said spout with its lower end resting on said valve closer, an upper valve closer movable into and out of the lower end of said sleeve for valving the flow of liquid downwardly therethrough, means for supporting said sleeve in any of a plurality of vertically spaced positions in said spout, means for supporting said upper valve closer in any of a plurality of corresponding positions on said valve stem, said upper valve closer positions being so spaced on said stem from the lower end of said stem that when said lower valve closer is in lower position said upper valve closer is just below said sleeve, and means for lifting said lower valve closer for opening the end of said spout and raising said stem and said upper valve closer into closed engagement with the lower end of said stem for preventing flow of liquid into the space in said spout beneath said upper valve closer.

References Cited in the file of this patent

UNITED STATES PATENTS

| | | |
|---|---|---|
| 677,815 | Sutton | July 2, 1901 |
| 1,763,971 | Kantor et al. | June 17, 1930 |
| 2,127,892 | Stewart | Aug. 23, 1938 |
| 2,599,686 | Bowman | June 10, 1952 |
| 2,603,397 | Olson | July 15, 1952 |